US011816725B2

(12) United States Patent
Jourdy

(10) Patent No.: US 11,816,725 B2
(45) Date of Patent: Nov. 14, 2023

(54) METHOD AND DEVICE FOR MANAGING THE RENTAL OF VEHICLES

(71) Applicant: LOJELIS HOLDING, Royat (FR)

(72) Inventor: Sylvain Jourdy, Royat (FR)

(73) Assignee: LOJELIS HOLDING, Royat (FR)

( * ) Notice: Subject to any disclaimer, the term of this patent is extended or adjusted under 35 U.S.C. 154(b) by 27 days.

(21) Appl. No.: 16/941,876

(22) Filed: Jul. 29, 2020

(65) Prior Publication Data
US 2021/0073902 A1 Mar. 11, 2021

(30) Foreign Application Priority Data

Sep. 11, 2019 (FR) ........................................ 1910006

(51) Int. Cl.
*G06Q 30/0645* (2023.01)
*G07C 5/00* (2006.01)
*G07C 5/08* (2006.01)
*G06Q 30/0283* (2023.01)

(52) U.S. Cl.
CPC ..... *G06Q 30/0645* (2013.01); *G06Q 30/0284* (2013.01); *G07C 5/008* (2013.01); *G07C 5/0808* (2013.01)

(58) Field of Classification Search
None
See application file for complete search history.

(56) References Cited

U.S. PATENT DOCUMENTS

| 6,060,989 | A | * | 5/2000 | Gehlot | B60K 28/066 340/576 |
| 7,889,931 | B2 | * | 2/2011 | Webb | G01N 21/8851 382/209 |
| 8,370,030 | B1 | * | 2/2013 | Gurin | B60R 1/00 340/425.5 |
| 10,664,917 | B1 | * | 5/2020 | Wasserman | G01C 21/3453 |
| 10,832,342 | B1 | * | 11/2020 | Gregorio | G07C 5/06 |
| 11,068,958 | B1 | * | 7/2021 | Rackley, III | G06Q 30/0645 |

(Continued)

FOREIGN PATENT DOCUMENTS

| DE | 102018002627 A1 * 10/2019 | ............. G03B 15/03 |
| EP | 2962903 A1 1/2016 | |

(Continued)

OTHER PUBLICATIONS

Yugang Yu, Yuxuan Dong, Xiaolong Guo, "Pricing for sales and per-use rental services with vertical differentiation", European Journal of Operational Research, vol. 270, Issue 2, 2018, pp. 586-598 (Year: 2018).*

(Continued)

*Primary Examiner* — Paul R Fisher

(57) ABSTRACT

The method for managing the rental of vehicles (1), comprising at least one step of collecting at least one point of data relating to the vehicle (1), one step of transferring said data to a rental vehicle management center (4), and one step of sending at least one instruction from the management center (4) to the vehicle, characterized in that it also comprises at least one step of collecting and sending at least one point of data relating to the user of the vehicle (1) to the management center (4) and one step of sending the user a final updated rate according to the data received by the management center (4). The invention also relates to a device for implementing the invention.

10 Claims, 2 Drawing Sheets

(56) References Cited

U.S. PATENT DOCUMENTS

| | | | |
|---|---|---|---|
| 2002/0184062 A1* | 12/2002 | Diaz | G06Q 10/08 |
| | | | 701/29.3 |
| 2006/0069475 A1* | 3/2006 | Gutierrez | G07C 5/085 |
| | | | 701/29.6 |
| 2007/0040911 A1* | 2/2007 | Riley | H04N 7/181 |
| | | | 348/E7.086 |
| 2008/0183535 A1* | 7/2008 | Kahana | G06Q 50/30 |
| | | | 705/37 |
| 2010/0207754 A1* | 8/2010 | Shostak | B60C 23/0433 |
| | | | 340/572.1 |
| 2011/0040692 A1* | 2/2011 | Ahroon | G06Q 99/00 |
| | | | 705/500 |
| 2015/0032580 A1 | 1/2015 | Altermatt et al. | |
| 2015/0100505 A1* | 4/2015 | Binion | G06Q 30/0278 |
| | | | 701/1 |
| 2015/0348058 A1* | 12/2015 | Liu | G06Q 30/0201 |
| | | | 701/31.5 |
| 2016/0144787 A1* | 5/2016 | Saward | H04N 1/2145 |
| | | | 701/29.1 |
| 2016/0239922 A1* | 8/2016 | Jimenez | G06Q 40/08 |
| 2017/0046669 A1* | 2/2017 | Chow | G06Q 10/0631 |
| 2017/0148102 A1* | 5/2017 | Franke | G06Q 30/0601 |
| 2017/0310827 A1* | 10/2017 | Mehta | H04M 11/04 |
| 2018/0155057 A1 | 6/2018 | Irish | |
| 2018/0225749 A1* | 8/2018 | Shoen | H04W 4/021 |
| 2019/0118589 A1* | 4/2019 | Patel | B60C 23/0471 |
| 2019/0234903 A1* | 8/2019 | Duarte | G01N 27/223 |
| 2019/0244283 A1* | 8/2019 | Umeda | G01C 21/3423 |
| 2019/0259227 A1 | 8/2019 | Desterling et al. | |
| 2019/0279120 A1* | 9/2019 | Suzuki | G06F 16/9536 |

FOREIGN PATENT DOCUMENTS

| | | | | |
|---|---|---|---|---|
| GB | 2408579 A | * | 11/2003 | G07C 5/00 |
| WO | 0070530 A1 | | 11/2000 | |
| WO | WO2010062899 A1 | * | 6/2010 | G06Q 40/00 |
| WO | WO2018013247 A2 | * | 1/2018 | G06N 99/00 |

OTHER PUBLICATIONS

Maysoon Abulkhair, Hani Sindi, Bashair Barsheed, Maria Al-Omari, Rana Al-Shehri, Rayana Al-Basarah, Waad Al-Harbi, Car Inspection System, Procedia Manufacturing, vol. 3, 2015, pp. 3128-3135, ISSN 2351-9789, https://doi.org/10.1016/j.promfg.2015.07.861. (Year: 2015).*

Singla, A., Santoni, M., Bartók, G., Mukerji, P., Meenen, M., & Krause, A. (2015). Incentivizing Users for Balancing Bike Sharing Systems. Proceedings of the AAAI Conference on Artificial Intelligence, 29(1). https://doi.org/10.1609/aaai.v29i1.9251 (Year: 2015).*

Europe Search Report dated Nov. 10, 2020, for Europe Application No. 20186489, filed Jul. 17, 2020.

* cited by examiner

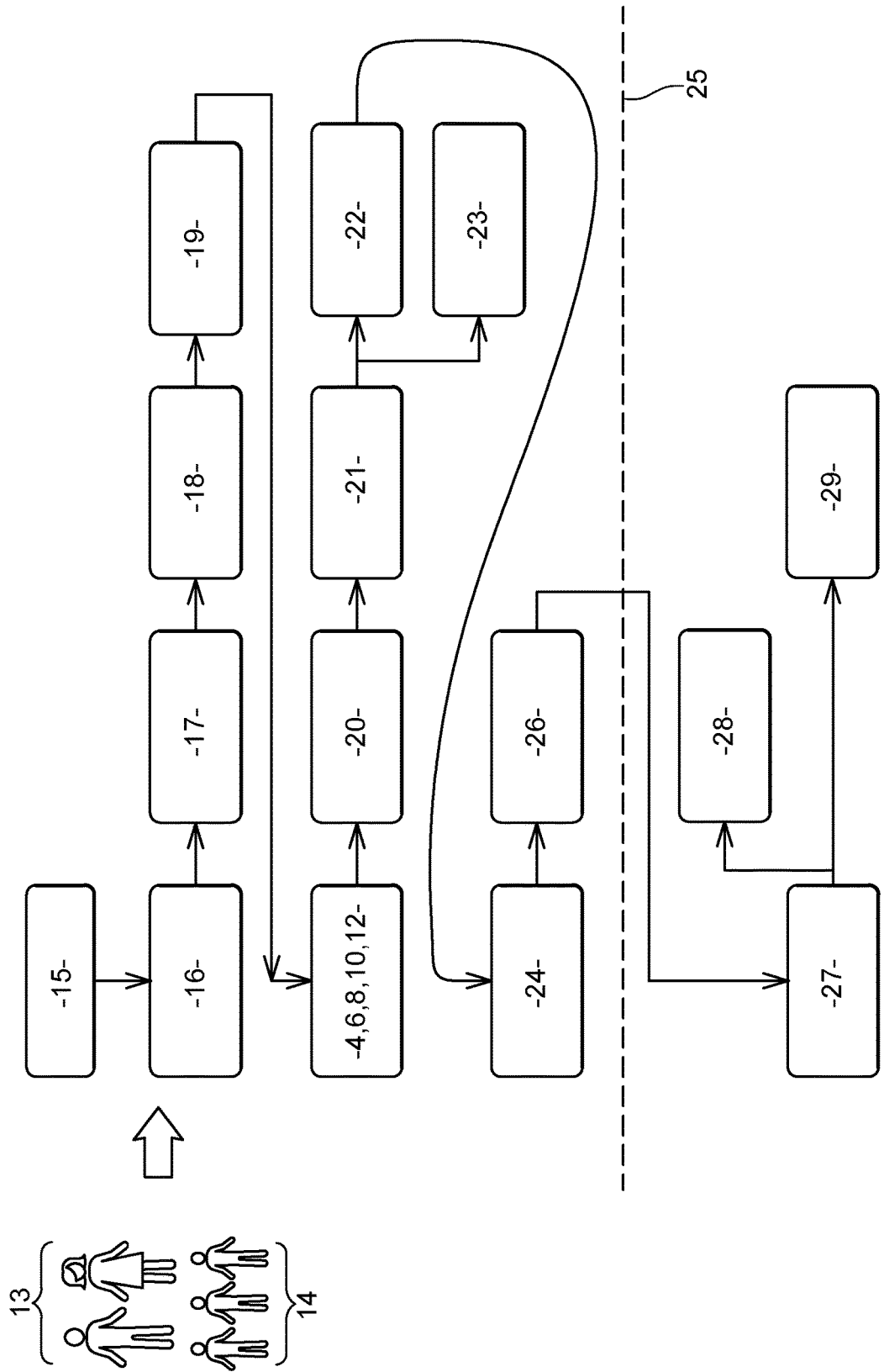

METHOD AND DEVICE FOR MANAGING THE RENTAL OF VEHICLES

The present invention relates to a method for managing the rental of vehicles. The invention also relates to a device for implementing the method constituting the object of the invention.

The term "vehicle" refers here not only to light vehicles having at least two wheels such as motorcycles, scooters, and cars but also recreational vehicles such as quads or snowmobiles, electric scooters, utility vehicles such as vans or trucks, as well as public works, agricultural, or maintenance equipment. Some noteworthy non-limiting examples in this category include backhoe loaders, cranes, concrete mixer trucks, tractors, aerial work platforms, and maintenance trucks. The invention also relates to non-terrestrial vehicles, typically jet-skis and motor boats or sailboats for river or maritime use.

The renting of vehicles, regardless of the type of vehicle and the rental period, is undertaken both by individuals and professionals in order to meet specific needs for travel or activity but also with an interest in optimizing costs associated with mobility, with rental periods ranging from a few hours to several months. In addition, the development of new communication technologies and new economic models gives rise to the self-service, automated provision of vehicles, including the returning thereof. Several solutions have been proposed for optimizing the various stages of the rental of a vehicle, namely the picking-up of the vehicle, the options proposed and selected by the renter, the inspection of the condition of the vehicle before and after rental, the location thereof at any time, and the place it is to be returned.

For instance, EP-A-2 962 903 discloses a method and a device comprising sensors in the vehicle that enable the renter, by telephone, to request the automatic activation of certain security, media, and/or comfort options with which his vehicle is equipped. The request is processed by a remote server center which instructs the vehicle to activate the options once the renter has paid for them.

FR-A-2 902 214 teaches a device for direct and continuous measurement of the position of the vehicle. These data are transmitted to a remote server, which allows for exact invoicing according to the mileage traveled once the vehicle has been returned.

FR-A-2 980 886 describes a device and a method for detecting incidents on a vehicle being rented. This detection is carried out by sensors, the data being sent directly to a server. These data are integrated into the vehicle's condition upon its return and give rise to invoicing, if necessary. If the incident detected is serious, the device can trigger an alert for the driver and/or emergency services.

FR-A-3 065 690 describes a similar device in which the data collected are analyzed, making it possible to determine whether the incident is an impact on the vehicle. Depending on the impact and the other data collected, the device triggers a vehicle condition check, a driver alert, a repair order, and/or an emergency call.

WO-A-00/70530 discloses a fully automatic system for transferring various data such as the mileage, vehicle condition, fuel level, and geolocation to a server center and enabling automatic pick-up and return, with a checking of information relating to the driver and the automatic inspection of the condition of the vehicle before and after rental.

US-A-2002/184 062 provides a solution for the risk of errors during the setting of the rental parameters, namely the mileage, the fuel level, and the condition of the vehicle, automatically at the start and end of the rental.

FR-A-2 801 994 describes a method for exchanging information between a rental vehicle and a management center even when the vehicle is distant from the management center. The information exchanged relates only to the condition and operation of the vehicle.

Although the prior art teaches several solutions for taking data relating to the vehicle into account and using them within the framework of an automated management of the rental of a vehicle, the fact remains that this information is used within a defined pricing framework and with a pick-up and/or return location that is fixed before the vehicle is picked up. However, users wish to have flexibility in the place of pick-up and/or return, the idea being to be able to have a vehicle available at a point that is as close as possible to the place where the user is located and to be able to return it to a point closest to his final destination. This trend is exploited with the services that are made available in certain cities for the provision of cars, scooters, bicycles, or electric scooters.

In addition, users can also request customizable pricing that corresponds to the service and actual use of the vehicle, understanding that the rate is currently defined at the outset, even with regard to the variable portion, which is generally only a function of the mileage traveled. Rental companies wish to have greater automation of the various tasks in order to optimize their services, manage their fleet of vehicles more easily by limiting vehicle downtime, and limiting the labor required. Moreover, the prior art only takes into account data relating to the vehicle and not other data likely to influence the movement of the vehicle, such as driving conditions, weather, or the behavior of the driver.

It is these needs that the invention proposes to satisfy by proposing a method and a device for managing the rental of vehicles that allow optimal automation of tasks and offer flexibility in pricing and locations for the picking-up and/or returning of the vehicle by integrating other data that influence the movement of the vehicle.

To this end, the object of the invention is a method for managing the rental of vehicles comprising at least one step of collecting at least one point of data relating to the vehicle, at least one point of data relating to the user, parameters relating to driving conditions, one step of transferring said data to a rental vehicle management center, and one step of sending at least one instruction from the management center to the vehicle, characterized in that it also comprises at least one step of sending the user a final updated rate according to the data received by the management center and in that, during the trip and before the final updated rate is sent, a rate that is updated as a function of the driving and condition of the vehicle obtained by collecting data using sensors is regularly provided to the user by the management center.

Thus, the user, and hence the renter, of the vehicle always benefits from a rate that is adapted to the fairest use he makes of the vehicle, this taking into account a maximum of data likely to influence the behavior of the vehicle and that of the driver. An updated rate based on the data collected is provided to the user practically in real time. Consequently, by modifying the vehicle utilization parameters—e.g., by modulating their speed, consumption, and engine load, and taking driving conditions into account—the driver, and hence the renter, influences the data that are taken into account and transmitted to the management center. The rate offered to them thus incorporates these parameters and is readjusted either up or down. Thus, the behavior of the renter towards the vehicle, and hence the condition thereof, is taken into account directly and continuously. In other words, the driver himself has an effect on the rental pricing by being, in a sense, one of the rate adjustment variables.

Furthermore, depending on the data transmitted to the management center and/or the wishes of the renter, the management center can also offer an optimized drop-off location, which also contributes to a customized rate.

According to advantageous but optional aspects of the invention, such a method can comprise one or more of the following steps:

The step of collecting data relating to the vehicle and the user is performed automatically by a gantry that is designed to collect data relating to the exterior of the vehicle and by sensors in the interior of the vehicle and produces a vehicle condition when the vehicle is picked up and returned.

The final discounted rate is sent a few kilometers or a few minutes before the vehicle arrives at the destination.

The invention also relates to a device for implementing the method for managing the rental of vehicles in accordance with one of the preceding steps, comprising at least one data sensor relating to the geolocation of the vehicle, one sensor for the condition of the exterior of the vehicle, one fuel level sensor, and one module for transferring the data collected to a remote management center, characterized in that it comprises at least one sensor for the condition of the interior of the vehicle, one sensor for at least one point of data relating to the operation of the engine, one sensor for at least one point of data relating to the driver, and one module for receiving and displaying information transmitted by the management center.

According to advantageous but optional aspects of the invention, such a device can comprise one or more of the following characteristics:

The device comprises a sensor for at least one point of data relating to the driver's driving abilities, a sensor for at least one point of data relating to the chassis of the vehicle, the undercarriage of the vehicle, the load of the vehicle, and the presence of accessories.

The device comprises a sensor for at least one point of weather data, and one point of data relating to driving and road conditions.

The invention will be better understood and other advantages thereof will become clearer from the following description, which is provided by way of non-limiting example and makes reference to the enclosed drawings, in which:

FIG. 3 is a simplified diagram illustrating the main steps of the process constituting the object of the invention.

FIG. 1 illustrates a vehicle 1. Purely by way of illustration, this figure shows a light vehicle such as those frequently encountered for rentals intended for individuals but also for professionals for short durations—typically a few weeks at most—or for long durations, meaning several months.

Figure 1:
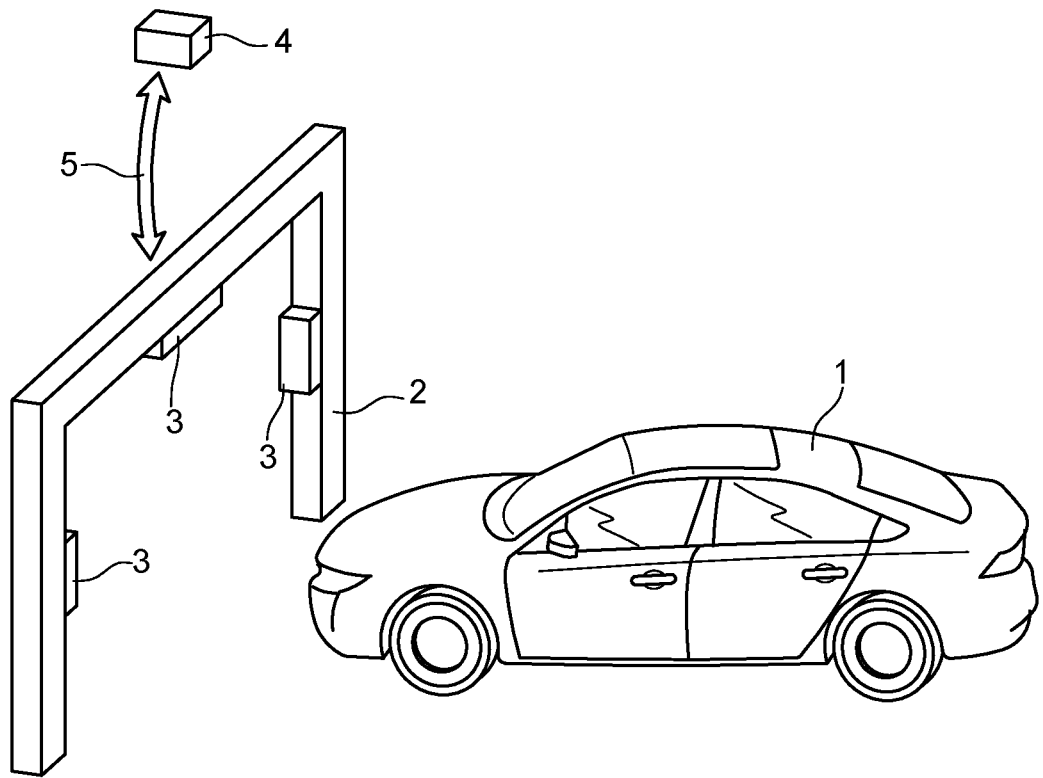
FIG. 1 is a simplified perspective view of a rental vehicle and of a portion of the device for implementing the method according to one embodiment of the invention.

The vehicle 1 shown is ready to pass under a gantry 2, it being understood that the passage takes place either by movement of the vehicle 1 in the direction of the fixed gantry 2 or by displacement of the gantry 2, for example on rails, the vehicle 1 being motionless.

The gantry 2 is shown here as a U-shaped element. In one variant, it has another shape, such as that of an L or of an arch. The gantry 2 is equipped with at least one sensor 3, with three sensors 3 being illustrated here. The number and/or positions thereof on the gantry 2 may differ. In one variant, the sensors are mounted on an aerial or terrestrial drone that is designed to automatically travel around the vehicle when the latter is stationary or moving at low speed.

According to the invention, the term "sensor" refers to any device, whether passive or active, having the function of collecting at least one physical, chemical, thermal, electrical, magnetic, or biological characteristic of the vehicle and/or of the driver of the vehicle by means of inherently known techniques. The term "data" will be used hereinafter to designate these characteristics.

These sensors 3, which are inherently known, are sensors that are designed to check at least one parameter that is representative of the condition of the exterior of the vehicle 1. Optical sensors are used for this purpose, for example, which take pictures of the vehicle 1 in the form of photos or videos under a specific light if necessary. Alternatively, other sensors are used in addition to and/or in place of the optical sensors. It can be a thermal or infrared sensor, for example. In all cases, the collected data is preferably transmitted in real time to a remote management center 4. Alternatively, the data collected are temporarily stored at the gantry 2. The data transmission is advantageously carried out by means of inherently known wireless means 5, for example a Wi-Fi, Bluetooth, 4G, radio, or other link. Alternatively, the data transmission from the gantry 2 is carried out by wired means.

Figure 2:
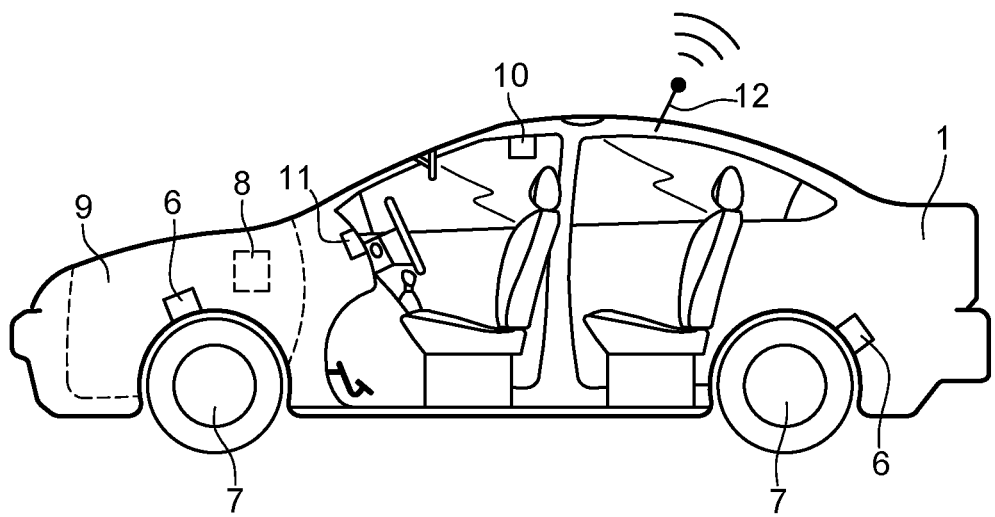
FIG. 2 is a simplified perspective view of the interior of the vehicle of FIG. 1.

The device for implementing the method which is the object of the invention also comprises sensors that are installed in the vehicle 1, as can be seen from FIG. 2. These can be sensors 6 that are designed to collect a characteristic of the undercarriage, i.e., of the tires 7 and/or shock absorbers of the vehicle 1. Such sensors 6 are designed, for example, to visually check the state of wear of the tires 7. When installed in the tire 7, the sensor checks the pressure. When installed on a shock absorber, an optical sensor can monitor the stroke of the shock absorber. Other sensors 8 are installed in the engine 9 of the vehicle 1 and check various parameters such as consumption, power, temperature, liquid levels, or other parameters relating to the operation of the engine 9. Advantageously, the sensors 8 are sensors that were originally installed in the engine by the manufacturer in order to manage and control the engine and to which it is possible to have access from the vehicle's on-board computer. It will readily be understood that, in the context of the invention, additional sensors are installed both in the engine and in the passenger compartment of the vehicle, or even on the exterior thereof.

The vehicle 1 also includes sensors 10 in the passenger compartment that collect data on the driver. This may include checking whether the driver is smoking, has put on his seat belt, checking his blood alcohol level, geolocating the vehicle, or determining whether the passenger compartment is clean. The vehicle 1 also comprises a component 11 that is designed to display information to the driver, this component 11 being advantageously provided with a communicating interface with the user in the form of a touch screen, for example. In this case, the driver can exchange information with the management center 4. The vehicle 1 is provided for this purpose with a means 12 for wireless communication with the management center 4. In one embodiment, the component 11 also includes a module for transferring data to the server center 4. Furthermore, the device uses the various data acquisition means, sensors, and communication means that are present in the vehicle 1 from the outset in order to implement the method. It will readily be understood that the vehicle 1 and the gantry 2 are equipped with sensors, data acquisition means, and means for communicating, controlling, and storing data that are required in order to implement the method constituting the object of the invention on the basis of the embodiments selected and the type of vehicle.

The process will now be described with reference to FIG. 3. A user, whether they are a natural person 13 or a legal entity 14 such as a company, association, or administration, must create a user account 15 with the vehicle rental company during a first step. This user account can take various parameters relating to the user 13 or 14 into consideration. Here, the term "user" will refer to the person who is driving the vehicle regardless of whether or not this person is the one who made the rental. Thereafter, the terms "user" and "driver" will be used interchangeably to refer to the driver of the vehicle.

In all cases, the identity of the user or of a plurality of users designated as drivers in the case of a legal entity 14, as well as the possession and validity of the driving license of each user, are taken into account. A lack of validity in at least one of these two points cancels the rental procedure for the user concerned, at least until the lack of validity is corrected.

The creation of the user account 15 is carried out by means of a connection to a dedicated and secure application 16, either from a computer, computer tablet, smart phone, or specific terminal. Alternatively, this is done at an agency or by telephone.

Once the user account 15 has been created, the user 13 or 14 chooses a vehicle 1 from a list 17 proposed by the rental company on the basis of availability, vehicle type, desired options, and geographic location of the vehicle relative to the desired pick-up location.

Once the vehicle 1 has been selected, the reservation is confirmed and a means for opening and/or starting 18 the vehicle 1 is given to the user 13 or 14. This can be a code sent by SMS, e-mail, postal mail, or orally by telephone, or it can be provided at an agency in the form of a key, whether intelligent or not. The key is either provided by an automatic terminal or sent by mail or courier. For the record, an "intelligent key" is an electronic communicating device that allows the vehicle to be opened and/or started without contact therewith, provided that the owner of this type of device is at a given distance from the vehicle.

The next step is carried out either before the opening of the vehicle 1 by the user 13 or 14 or when the latter is in position in the vehicle 1 and is able to consult information on the component 11 of the vehicle 1. This step consists in providing a vehicle condition prior to the starting of the vehicle 1 by the user 13 or 14. This initial condition of the vehicle 1 is denoted by 19. It can correspond either to a condition at end of rental following a previous rental, or to a condition produced by the renter after repairing, cleaning, and/or bringing the vehicle into conformity, independently of whether or not the vehicle was rented previously. It may also be the condition of the vehicle 1 before its first rental, for example in the case of a new vehicle 1.

According to one embodiment, the condition of the vehicle 19 is determined by passing the vehicle 1 under the gantry 2. In this case, all of the sensors on the exterior and interior of the vehicle 1 and those of the gantry 2 are used to provide information to the management center 4 on the condition of the vehicle 1. This determination of the initial condition 19 is completed by the user 13 or 14 if necessary, for example in the event of an oversight or error in one of the points for verifying the condition of the vehicle. The user can also make additional comments, for example on points not provided for in the initial condition 19, such as a strong tobacco smell or windows left open when it rained before his arrival.

Once the initial condition 19 has been accepted by the user 13 or 14, when the vehicle 1 is started, or at least when the user 13 or 14 starts the electrical and electronic devices of the vehicle by switching on the ignition, the management center 4 uses the communication means 12 to initiate the activation of the sensors 6, 8 and 10, causing information relating to the user, his choices, and the possibility of a so-called customized rate to be displayed on the display component 11. This step is denoted by 20 and, from this moment, the user 13 or 14 will have access, either continuously or regularly to a customized rate, it being understood that this customized rate is optional, the user 13 or 14 being able to choose to apply it. In that case, it is no longer possible to return to non-customized pricing at the end of the rental. Alternatively, the user always has the option of dropping the customized rate or not when returning the vehicle 1 at the end of the rental.

Thereafter, the various sensors 6, 8, and 10 regularly or continuously collect data relating to the driver, the vehicle, and the user's driving type, as well as on parameters relating to driving conditions. The various sensors, including the vehicle's internal computer, are thus used to collect information concerning, but not limited to, the location of the vehicle, number of passengers, vehicle load, the presence of a trailer or an accessory such as a roof box or a bicycle rack, the instantaneous and average speed, weather, tire pressure, consumption, the engine load in terms of power and gear ratios, the use of shock absorbers, the cleanliness of the passenger compartment, compliance with the highway code, and driving tips such as stopping every two hours, or even road and traffic conditions. In other words, during this step, denoted by 21, a set of data that makes it possible to verify whether the driving of the vehicle 1 is optimal—i.e., whether it is best preserving the integrity and the characteristics of the vehicle, passengers, and other road users—is taken into account and transferred to the management center 4 via the transmission means 5. As will readily be understood, the list of parameters considered may change during the use of the vehicle. In this case, the management center 4 updates the data to be taken into account by activating, deactivating, or modifying sensors. The data collected in this way are compared with data that were collected previously and/or data supplied by the manufacturer and relating to a vehicle 1 traveling according to optimal driving parameters. The comparison is advantageously performed automatically with software that has been specifically developed by the management center 4. Such software advantageously works by learning.

Upon completion of this comparison, which is carried out continuously or regularly, the display component 11 informs the user 13 or 14 of the updated rate 22 that is based on his behavior. The updated rate 22 is modulated by external parameters that are independent of the user and/or of the vehicle, such as driving conditions, road traffic, road conditions, and/or weather. Such displaying is carried out either according to a mileage- or time-based periodicity, either continuously or at the user's request. In all cases, the rate is updated according to the parameters collected. The user thus benefits from a constantly updated rate. The initial rental rate is reduced or increased, accordingly, depending on the user's behavior. Such a display allows the user to adapt his behavior and, in return, to have a financial incentive consisting of a reduction in his initial rate.

The user can also benefit from bonuses that he can use during another rental, for example, or that can be exchanged with partners providing services or products. Such a solution, denoted by 23 in FIG. 3, applies particularly in the case of the rental management of a fleet for a company, but it can also be applied to a single rental.

In addition to displaying the updated rate 22, the server center 4 can offer the user to return the vehicle 1 to a location close to his destination but which corresponds to an area where the number of vehicles available for future rental is relatively small. This incentive 24 takes the form of a discount on the updated rate 22.

The updated rate 22 is no longer updated on the basis of the geolocation data a few miles or a few minutes before arrival 25 at the destination. A final updated rate 26—and hence a fixed updated rate that cannot be modified by the behavior of the user 13 or 14 up to the point of return—is displayed five kilometers or ten minutes before arrival, for example.

Once at the destination—or, more precisely, once it has arrived at the place of return—the vehicle 1 then undergoes an automated check using the sensors on the exterior and interior of the vehicle 1 and gantry 2 in order to establish a final vehicle condition 27. In other words, the vehicle passes an automatic check at the start and at the end of the rental using a gantry 2 and internal sensors 6, 8, and 10. The final vehicle condition 27 is transmitted to the management center 4.

An invoice 28 is then issued taking into account not only the final updated rate 26 but also the final vehicle condition 27 and compliance with the conditions of return initially given to the user, e.g., the time of return and the fuel level.

In other words, if anomalies or degradations and/or incidents during the trip are noted, they negatively impact the invoice 28. The latter is included with the final condition 27 also given to the user 1. Advantageously, a history and/or a comparison between the initial and updated rates is also provided to the user. Payment is made by direct debit from a bank card or a customer account, for example, or by any other means. It will readily be understood that additional costs, for example, the payment of a fine, can be added subsequently to the user's invoice 13 or 14 upon receipt of said costs by the rental company.

A summary 29 of the rental and/or of the trip and/or of the payment is sent to the user 13 or 14.

At the end of the rental, the user can schedule another rental while now choosing the type of rate he wishes to have from then on.

The invention claimed is:

1. A method for managing the rental of a vehicle, comprising:
  creating a user account for a vehicle rental company by means of a connection to a dedicated application, the user account associated with a driver;
  choosing a vehicle, vehicle options, a pick-up location, and a drop-off location;
  before departing from the pick-up location, determining an initial condition of the vehicle automatically by collecting initial condition data with interior sensors of the vehicle, exterior sensors of the vehicle, and gantry sensors located on a gantry located at the pick-up location, and wirelessly transmitting the initial condition data from the interior sensors of the vehicle and the exterior sensors of the vehicle via a wireless communication means and from the gantry sensors to a management center via a gantry communication means;
  after the initial condition of the vehicle has been accepted by the driver, displaying information relating to the driver, driver choices, and a customized rate on a display unit in the vehicle based on data wirelessly transmitted from the management center;
  during operation of the vehicle after determination of the initial condition until determination of a final condition of the vehicle, continuously collecting at least one data relating to the vehicle, at least one data relating to driver behavior, and external parameters relating to driving conditions with the interior sensors of the vehicle and external sensors of the vehicle, and continuously transferring the at least one data relating to the vehicle, the at least one data relating to driver behavior, and the external parameters relating to driving conditions from the interior sensors of the vehicle and external sensors of the vehicle via the wireless communication means to a software program at the management center;
  continuously updating the customized rate displayed on the display unit upon the vehicle departing from the pick-up location until a determination of a final customized rate, such that the customized rate continuously increases or decreases as the driver deviates from or approaches optimal driving parameters, in order to incentivize the driver to maintain the optimal driving parameters during operation of the vehicle;
  wirelessly sending a final customized rate from the software program to the display unit in the vehicle based on geolocation data of the vehicle when the vehicle is a set distance or a set time from arrival at the drop-off location, and incentivizing the driver to optionally return the vehicle to a secondary drop-off location with a deficiency of other vehicles for rental by offering a price discount on a rental invoice, the price discount and secondary drop-off location provided on the display unit;
  when the vehicle is returned to the drop-off location or secondary drop-off location, determining the final condition of the vehicle by automatically collecting final condition data with the interior sensors of the vehicle, the exterior sensors of the vehicle, and second gantry sensors located on a second gantry, and wirelessly transmitting the final condition data from the interior sensors of the vehicle and the exterior sensors of the vehicle via the wireless communication means and from the second gantry sensors via a second gantry communication means to the software program at the management center; and
  providing the driver with the rental invoice, which is calculated based on the final customized rate, the final condition of the vehicle, applicable price discounts, and applicable fines,
  wherein the software program continuously updates the customized rate by continuously comparing the at least one data relating to the vehicle, the at least one data relating to the driver behavior, and the external parameters relating to driving conditions, which are continuously wirelessly sent to the software program from the interior sensors of the vehicle and exterior sensors of the vehicle, with previously collected data relating to the vehicle, previously collected data relating to other driver behavior, previously collected external parameters relating to driving conditions, and manufacturer-supplied data stored in the software program that correlates to optimal driving parameters, and continuously wirelessly sending updates to the customized rate from the software program at management center to the display unit in the vehicle,
wherein the optimal driving parameters include integrity of the vehicle, safety of the driver and occupants of the vehicle, and integrity and safety of other vehicles and road users.

2. The method of claim 1, wherein the gantry is fixed in place and the vehicle moves under the gantry to collect the initial condition data.

3. The method of claim 1, wherein the gantry is movable along rails over the vehicle to collect the initial condition data.

4. The method of claim 1, wherein the second gantry is fixed in place and the vehicle moves under the gantry to collect the final condition data.

5. The method of claim 1, wherein the second gantry is movable along rails over the vehicle to collect the final condition data.

6. The method of claim 1, further comprising, before the initial condition of the vehicle has been accepted by the driver, the driver optionally can make comments on the initial condition of the vehicle.

7. The method of claim 1, wherein the interior sensors of the vehicle include a seatbelt sensor, a smoke sensor, and a blood alcohol level sensor.

8. The method of claim 1, wherein the exterior sensors of the vehicle include a brake sensor and a shock absorber sensor.

9. The method of claim 1, wherein an on-board computer of the vehicle is both an exterior sensor of the exterior sensors of the vehicle and an interior sensor of the interior sensors of the vehicle.

10. The method of claim 1, wherein a geolocation sensor is installed in the vehicle to provide at least the geolocation data.

* * * * *